United States Patent [19]

Lim

[11] Patent Number: 5,174,641
[45] Date of Patent: Dec. 29, 1992

[54] VIDEO ENCODING METHOD FOR TELEVISION APPLICATIONS

[75] Inventor: Jae S. Lim, Winchester, Mass.

[73] Assignee: Massachusetts Institute of Technology, Cambridge, Mass.

[21] Appl. No.: 557,934

[22] Filed: Jul. 25, 1990

[51] Int. Cl.$^5$ .................. H04N 7/04; H04N 7/00; H04N 7/01
[52] U.S. Cl. .................. 358/141; 358/140; 358/214
[58] Field of Search .............. 358/133, 141, 140, 105, 358/214, 215, 12

[56] References Cited

U.S. PATENT DOCUMENTS

| | | | |
|---|---|---|---|
| 2,939,909 | 6/1960 | Toulon et al. | 358/21 |
| 3,715,483 | 2/1973 | Limb et al. | 358/133 |
| 4,184,177 | 1/1980 | Millward | 358/214 |
| 4,494,144 | 1/1985 | Brown | 358/133 |
| 4,620,225 | 10/1986 | Wendland et al. | 358/141 |
| 4,838,685 | 6/1989 | Martinez et al. | 352/85 |
| 4,931,855 | 6/1990 | Salvadorini | 358/12 |
| 4,998,287 | 3/1991 | Katznelson et al. | 382/34 |
| 5,072,296 | 12/1991 | Lim | 358/140 |

FOREIGN PATENT DOCUMENTS

0075072 5/1982 Japan .................. 358/214

Primary Examiner—James J. Groody
Assistant Examiner—Safet Metjahic
Attorney, Agent, or Firm—Fish & Richardson

[57] ABSTRACT

Continuously monitoring successive frames of a video signal and deciding, based on the similarity between the frames, whether to encode one of them with low or high information content, i.e., as a "low-resolution" frame or a "high-resolution" frame, and whether to encode the next transmitted frame as a low- resolution frame or as a high-resolution frame, and, when sending a high-resolution frame, determining whether to transmit an indication to re-display the past frame or to transmit an indication to display the high-resolution frame as a representation of the present frame. The compression method provides efficient compression of a video signal. A single future frame embodiment allows up to a doubling of the number of pixels transmitted through a channel. With multiple frame systems, even higher compression ratios are possible. Further improvements in compression ratios may be obtained by compressing the individual frames.

31 Claims, 12 Drawing Sheets

VIDEO ENCODING METHOD FOR TELEVISION APPLICATIONS

BACKGROUND OF THE INVENTION

This invention relates to the encoding of video signals.

Video signals are normally transmitted from their source to a destination viewing station, such as a television set, in a series of frames, which are successively displayed to give the illusion of motion.

In general, higher resolution frames (frames with higher numbers of pixels) are capable of carrying more information and will appear sharper to the viewer. It is thus advantageous, when transmitting video signals through communications channels (e.g. cables or modulated radio frequency transmissions), to communicate as many pixels therethrough as the bandwidth of the channel will permit.

It is known to use various data compression methods to increase the amount of video information communicated over a channel.

SUMMARY OF THE INVENTION

In general the invention features, in a first aspect, continuously monitoring successive frames of a video signal and deciding, based on the similarity between the frames, whether to encode one of them with low or high information content, i.e., as a "low-resolution" frame or a "high-resolution" frame. (The terms "low-resolution" and "high-resolution" are used for simplicity, with the understanding that the benefits derived from the higher amount of information associated with a "high-resolution" frame may be used in more ways than an increase in resolution; e.g., a higher signal-to-noise ratio may be achieved.)

In a second aspect, the invention features deciding whether to encode the next transmitted frame as a low-resolution frame or as a high-resolution frame, and, when sending a high-resolution frame, determining whether to transmit an indication to re-display the past frame or to transmit an indication to display the high-resolution frame as a representation of the present frame.

The compression method of the invention is advantageous in that it provides efficient compression of a video signal. A single future frame embodiment allows up to a doubling of the number of pixels transmitted through a channel. With multiple frame systems, even higher compression ratios are possible. Further improvements in compression ratios may be obtained by compressing the individual frames.

The invention always guarantees at least a doubling of effective bandwidth when 24 frames/second film material is being transmitted (either by the American 3-2 pull-down format or the European 2-2 pull-down format). This is advantageous because filmed material is very commonly transmitted and is generally of high spatial bandwidth. The method of the invention is also advantageous in that errors induced in the signal do not tend to propagate for large numbers of frames. Receivers may be implemented with little frame memory, as storage for two frames is sufficient to operate using the preferred single future frame case. At the same time, the system may be expanded to use any economical amount of future frame storage and thus provide higher compression ratios. By using column interpolation techniques for the non-compressed frames, individual high- and low-resolution frames may be decoded with the same circuitry. The decision circuitry allowing a biased choice between similar adjacent high bandwidth frames provides for reduced jitter.

Other advantages and features of the invention will be apparent from the following description of a preferred embodiment, and from the claims.

DESCRIPTION OF THE PREFERRED EMBODIMENT

DETAILED DESCRIPTION OF THE INVENTION

Figure 1:
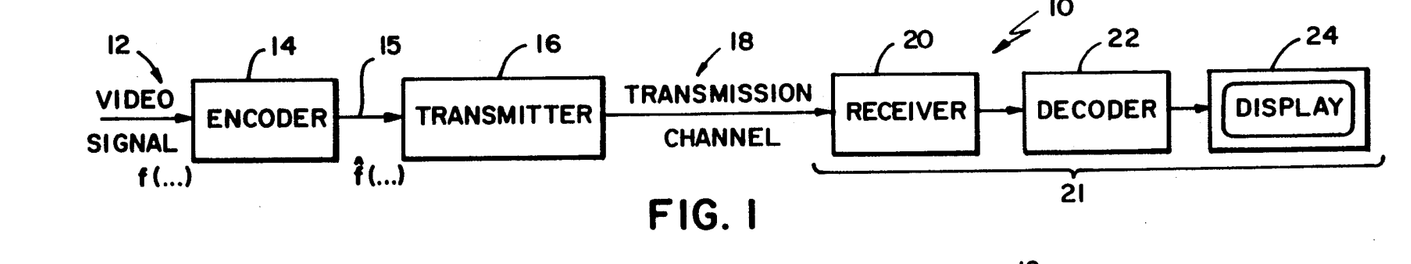
FIG. 1 is a block diagram of an overall video transmission and reception system.

Referring to FIG. 1, video encoding and decoding system 10 includes an encoder 14 that receives a video signal 12 of a certain bandwidth (i.e., a certain number of bits per second or Hz) and encodes it to produce a compressed video signal. This compressed video signal 15 will have a certain bandwidth that is usually lower than that of the video signal. However, the encoding operation should achieve the objective of maintaining in the reduced bandwidth as much as possible of the information that is important to the viewing of the video signal once displayed.

This reduced bandwidth (reduced number of bits or Hz) is important because it allows more channels of information or the same number of higher resolution channels to be transmitted over the transmission channel 18 by the transmitter 16. The transmission channel 18 may be a cable, an over-the-air (terrestrial) modulated radio frequency transmission of a certain bandwidth, or a direct-broadcast-satellite (DBS) channel.

The receiving apparatus 21 includes a receiver 20, a decoder 22 and a display 24. The receiver 20 receives the signal transmitted over the transmission channel 18 and passes it onto the decoder 22. The decoder decodes the signal into a useable video signal and relays it to a display 24.

Figure 2:
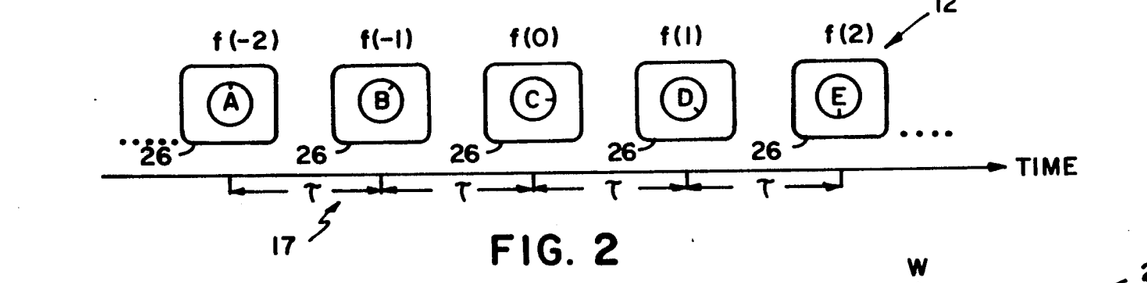
FIG. 2 illustrates a time sequence of video frames.

Referring to FIG. 2, the video signal 12 is, in essence, made up of a sequence of consecutive frames 26 A, B, C ... that are to be displayed in succession at intervals of $\tau$ seconds to produce an illusion of motion. For broadcast television in the United States, 60 frames are displayed per second ($\tau = 1/60$), and in Europe, 50 frames per second are displayed ($\tau = 1/50$). In the NTSC system, currently used in the United States, 59.94 interlaced fields are displayed per second. For convenience (without loss of generality), we will assume a 60 Hz rate. In several HDTV (high definition TV) system proposals in the United States, a frame is a progressively scanned frame without interlacing. We will use progressively scanned frames in our discussion, but the invention also applies to interlaced fields with straight-forward modification. The frame that is currently being displayed is known as f(0). Past frames are given the labels f(−1), f(−2) and so on, and future frames are given the labels f(1), f(2) and so on. Once encoded by the encoder 14 and decoded by the decoder 22, the reconstructed frames are given the labels f̂(1), f̂(2) and so on.

Figure 3:
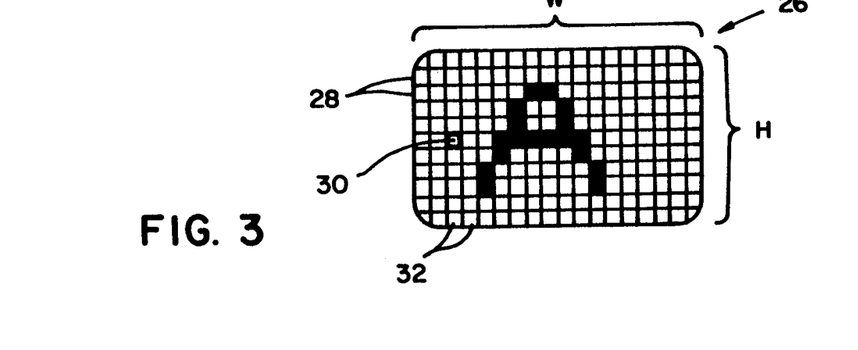
FIG. 3 is a representative diagram of a single video frame.

Referring to FIG. 3, each frame 26 is made up of a series of pixels 30 which are arranged in a rectangular matrix of lines 28 and columns 32. As can be seen from this figure, the size of the pixels is important to the final appearance of the frame, a higher number of pixels providing a greater degree of sharpness.

Figure 4:
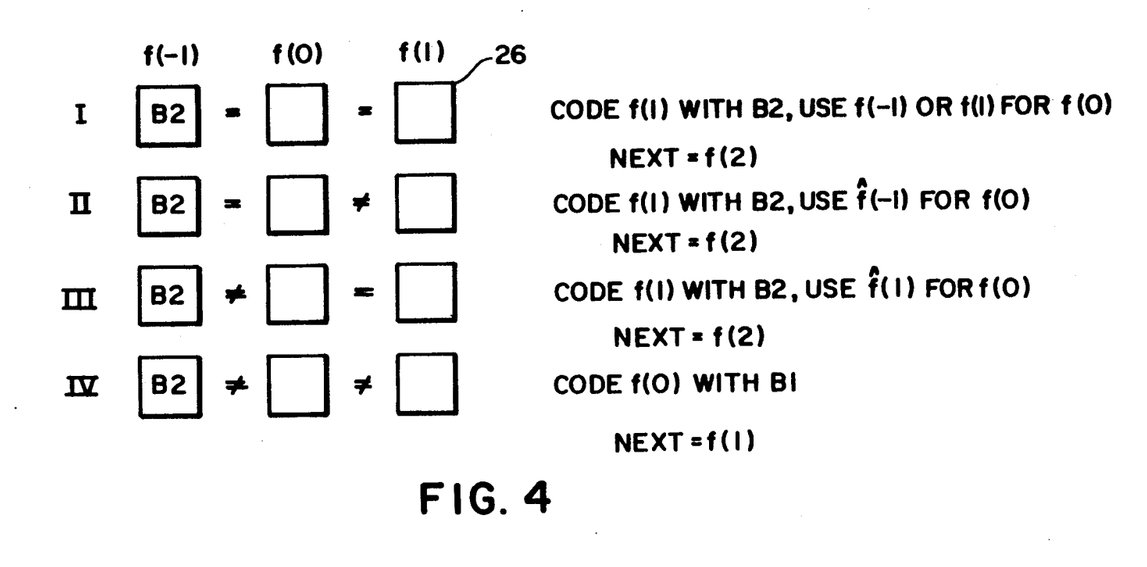
FIG. 4 is a block diagram showing all of the possible combinations of frames adjacent to a present frame for the situation in which the previous broadcast frame was a high-resolution frame.
Figure 5:
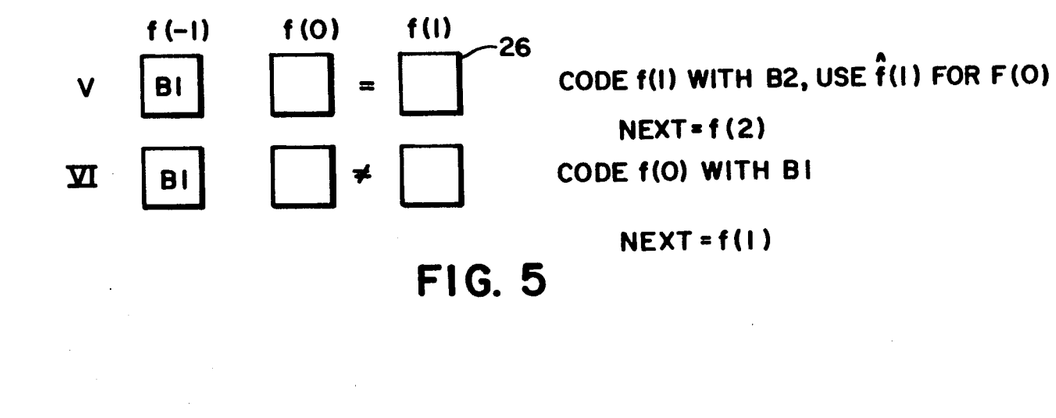
FIG. 5 is a block diagram showing all of the possible combinations of frames adjacent to a present frame for the situation in which the previous broadcast frame was a low-resolution frame.

Referring now to FIGS. 4 and 5, the encoding performed by the encoder 14 is presented. In the system of the present embodiment of the invention, the encoder 14 considers three frames at a time. The first frame considered is the frame that has just been transmitted f(−1). The second frame considered is the frame that is currently being encoded f(0) and the final frame considered is the frame that is to be encoded next f(1). It should be noted that the system may be implemented with more than the three frames, as will be described further on.

Each of these three frames may be encoded to be transmitted in different length time-slots. Frames transmitted in a longer time-slot will include a higher amount of information. This higher amount of information may be used in a variety of ways, such as to obtain a higher signal-to-noise ratio in the received video or to transmit higher resolution frames. In the present embodiment, the frames may be transmitted at two time slot lengths yielding frames with a lower information content and frames with a higher information content. For simplicity and clarity, these two types of frames are referred to as "low-resolution" and "high-resolution" frames with the understanding that the benefits derived from the higher amount of information may be used in more ways than an increase in resolution.

Low-resolution frames are transmitted at about 60 Hz and may thus occupy a bandwidth B1 approximately equal to that of the transmission channel 18. High-resolution frames have a bandwidth B2 that is double that of the low-resolution frames (i.e., they require transmission of twice the number of bits as a B1 frame) and can only be transmitted at half the frame rate, or 30 times per second in the case of the United States standard rate. A function of the encoder is to encode and transmit the high-resolution frames in lieu of a consecutive pair of low-resolution frames when it is advantageous.

Figure 8:
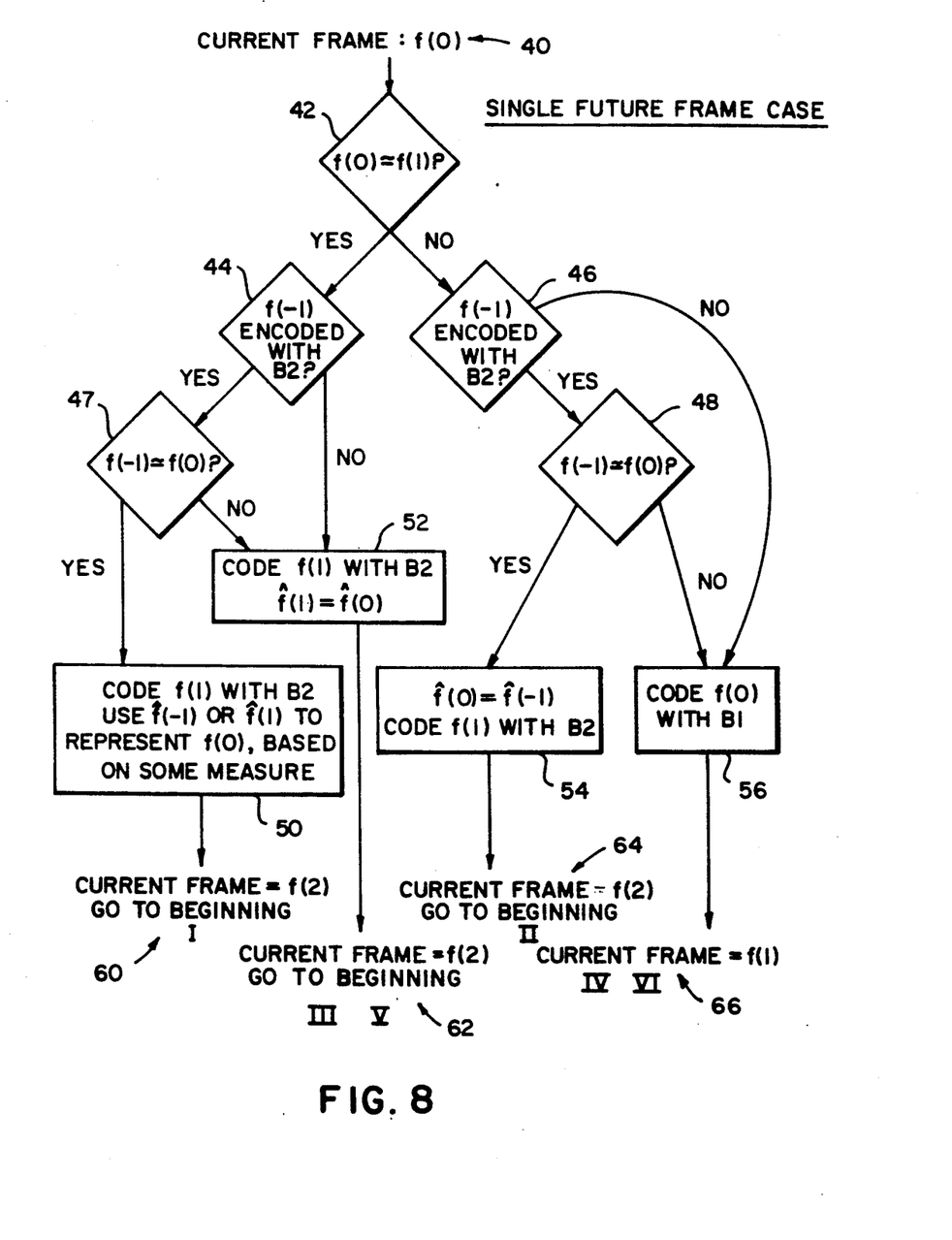
FIG. 8 is a flowchart illustrating the method of the invention for a single future frame.

In order to determine which frame time slots are to receive low-resolution frames and which are to receive high-resolution frames, the three frames are examined (see FIGS. 4, 5 and 8). The first determination 42 made in FIG. 8 is whether the current frame f(0) is similar to the future frame f(1). In order to gauge the similarity of these two frames, a function is applied to the two frames and the resulting value is compared with a certain threshold value. If the resulting value is below the threshold, the frames are similar enough to each other that the viewer would not object to the two similar frames being replaced by two identical high-resolution frames.

Several gauging functions may be used in determining the similarity of the two frames. A simple function uses the mean of the square of the differences between the individual pixels in the two frames. This is known as the mean square error or MSE. A more complex method is to evaluate the displacement magnitude (DM) and the motion compensated mean square error or MCMSE of the two frames. In this case, the two frames are considered similar when both the DM and the MCMSE are small relative to the chosen thresholds for DM and MCMSE. This method has the advantage of de-emphasizing very slight motions as a factor in the determination of similarity between two frames. The methods of estimating the displacement amount used in evaluating the DM and the MCMSE are described in more detail in my book entitled "Two Dimensional Signal and Image Processing", published by Prentice Hall in 1990. Other functions are of course useable, with considerations for their choice including their speed, efficiency, ease of implementation, and their ability to accurately discriminate between successive frames that are different enough to be required to be sent separately and those that are not, as governed by the viewer's perceptual parameters. The chosen function is also used in determining 47,48 whether the past and present frames are similar.

A further determination 44,46 is generally available from the previous step of processing the past frame $f(-1)$ and is a determination of the resolution of the past transmitted frame. If the past frame required a high bandwidth B2, there are four possible cases I-IV to consider (shown in FIGS. 4 and 8). It bears noting that the determinations made in deciding which case is to be considered may be made in a different order than the one presented above and in connection with FIG. 8.

In case I, the past $f(-1)$ and present $f(0)$ frames are similar and the present $f(0)$ and future $f(1)$ frames are similar, and the future frame $f(1)$ is encoded at high-resolution B2 in the time slots 17 normally allocated to the present and future frames.

The encoder must now determine 50 whether it is better to keep displaying the past frame during the current frame time slot or to display the future frame at this time. Both frames have high resolution B2, but undesirable jitter can occur if the choice between the frames is made solely on the basis of which is the most similar to the current frame. A better technique for making the choice is to always use either the future or the past frame, unless the difference in similarity is pronounced (i.e., unless one of the frames is much closer to the present frame than the other). Note that it is reasonable to prefer the future frame since the future frame becomes the past frame in the next processing step.

Figure 6:
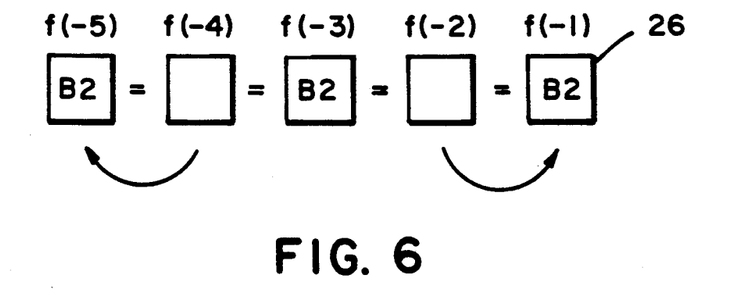
FIG. 6 illustrates a possible encoding sequence for a series of five broadcast frames.
Figure 7:
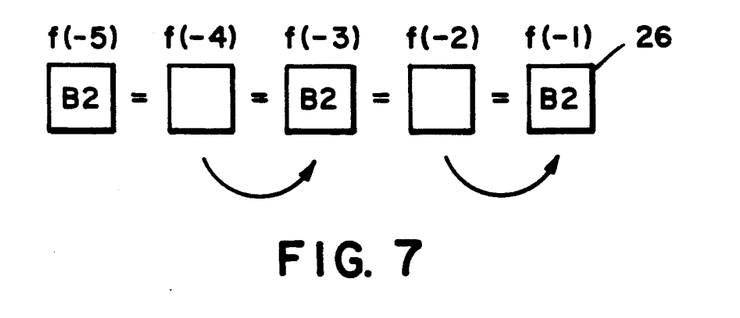
FIG. 7 illustrates a second possible encoding sequence for a series of five broadcast frames.

This can be seen from FIGS. 6 and 7 which show the frames displaying the same uniform motion encoded respectively with and without checking for pronounced differences. In FIG. 6, $f(-4)$ is more similar to $f(-5)$ than to $f(-3)$. Similarly, $f(-2)$ is more similar to $f(-1)$ than to $f(-3)$. The resulting output is uneven, even though the motion is even. Furthermore, since the difference between the similarity of two sets of succeeding frames is small, the decisions are made on a very narrow basis and may tend to flicker back and forth.

In FIG. 7, it can be seen that the determination will be made the same way each time, if the differences between succeeding frames are similar. This will make the appearance of the uniform motion more even than it would in the sequence of FIG. 6.

Once a determination has been made with respect to the appropriate adjacent frame to display in the present frame's time slot, an instruction code is added to the compressed video signal 15. This instruction code is recognized by the decoder 22 and the decoder re-displays the appropriate frames. This completes processing in a case I situation. The next frame is then skipped 60, as its slot is already allocated to the second half of its high-resolution frame. Thus, the next frame to be processed in this case would be frame $f(2)$.

Referring again to FIGS. 4, 5 and 8, in case II, the past $f(-1)$ and present $f(0)$ frames are similar and the present $f(0)$ and future $f(1)$ frames are not similar. As a result 54, the future frame is encoded at high resolution B2 in the time slots 17 normally allocated to the present and future frames, and the present frame is represented by the past frame. As in case I, the next frame to be processed 64 in this case would be frame $f(2)$.

In case III, the present and future frames are similar and the present and past frames are dissimilar. As a result 52, the future frame is encoded at high resolution in the time slots normally occupied by the present and future frames and the present frame is represented by the future frame. As in cases I and II, the next frame to be processed 62 in this case would be frame $f(2)$.

In case IV, the past, present and future frames are all dissimilar. As a result 56, the present frame is encoded at low-resolution, since it can not share a representation with one of its neighbors. The next frame to be processed 66 in this case is $f(1)$, as its time slot has not been determined.

In case V, the present and future frames are similar, and the past frame is a low-resolution frame. In this case, the past frame must be different from the present frame, because if they were similar, the two would have been encoded together as a high-resolution frame on the last processing step. It is thus apparent that cases III and V result in the same operations.

Though cases III and V result in the same operations, less computation is required to identify case V, because one similarity determination 47 is not needed. If computational efficiency was not a high priority, the determinations 44,46 of the resolution of the past frame could be eliminated and the method would still function properly.

In case VI, the present and future frames are dissimilar, and the past frame is a low-resolution frame. As in case V, the past and present frames must be different if the method of the invention had been applied on earlier frames. Case IV and case VI therefore result in the same operations.

As was noted earlier, the system of the invention may be expanded to consider multiple future frames. In the three frame embodiment outlined in FIG. 9, the system would make determinations based on a total of four frames and could encode frames in three resolutions corresponding to three different bandwidths B1, B2, B3.

Figure 9:
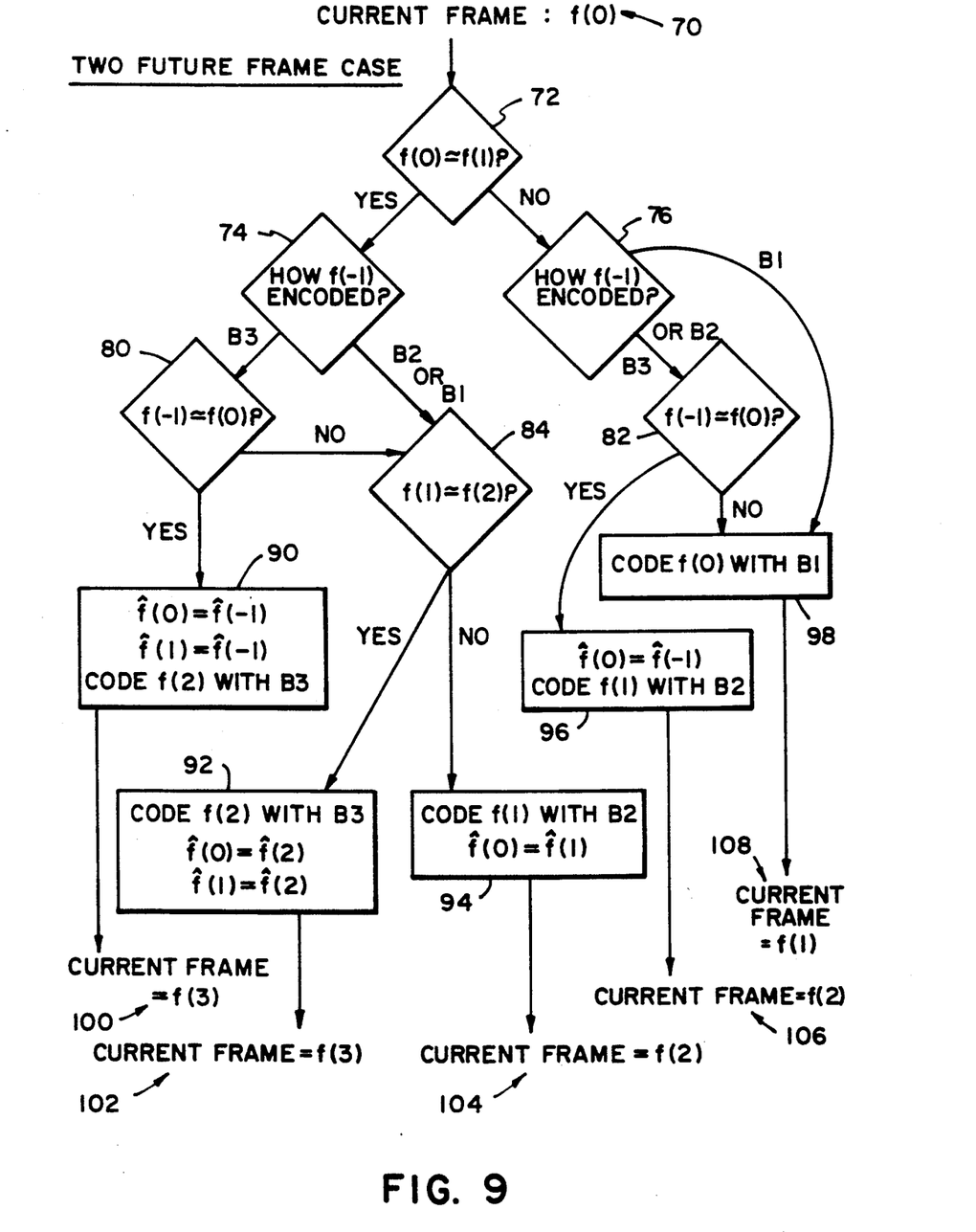
FIG. 9 is a flowchart illustrating the method of the invention for two future frames.

For a given current frame 70, the two future frame method of FIG. 9 includes determinations of the similarity of the current and future frames 72, of the similarity of the past and present frames 80,82, and of the similarity of the two future frames 84. The type of encoding used in the past frame 74, 76 is also considered. Based on these determinations, several outcomes 90,92,94,96,98 are possible. These outcomes involve encoding frames in the three different bandwidths B1, B2, and B3. The next current frame may be $f(1)$ 108, $f(2)$ 104,106 or $f(3)$ 100,102.

The system could be expanded to consider as many future frames as would be economically reasonable. Systems simultaneously evaluating higher numbers of frames will be able to transmit higher resolution frames.

Figure 14:
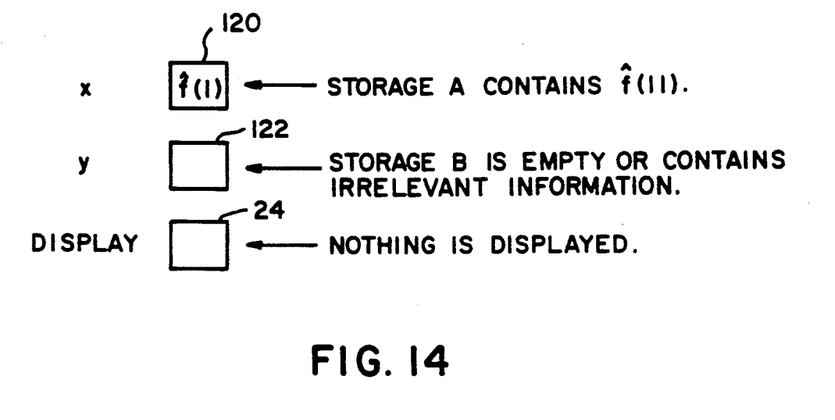
FIG. 14 is a diagram illustrating the status of the two storage locations and the display of the embodiment at the starting point of a decoding cycle.

It is possible to implement the single future frame method of the invention using little more memory than that required to store two high-resolution frames at the receiver. Referring to FIG. 14, a first storage buffer 120 and a second storage buffer 122 are arranged within the receiving apparatus 21 to communicate with the decoder and the display 24 via a bus (not shown). The storage buffers are preferably implemented using high speed memory in order to accommodate high bit rates.

When the receiving apparatus 21 is first turned on or its channel is changed, it waits until it can fill the first buffer with one full decoded frame $\hat{f}(11)$. The status once this frame is loaded into the first buffer is shown in FIG. 14 and is called the starting state or basic state. It should be noted that the unused memory in the second buffer may be used for other purposes until it is needed for the next frame. After this starting state three possible sequences can occur. These display cases are illustrated in FIGS. 15-17 and have been dubbed display cases 1-3.

Figure 15:
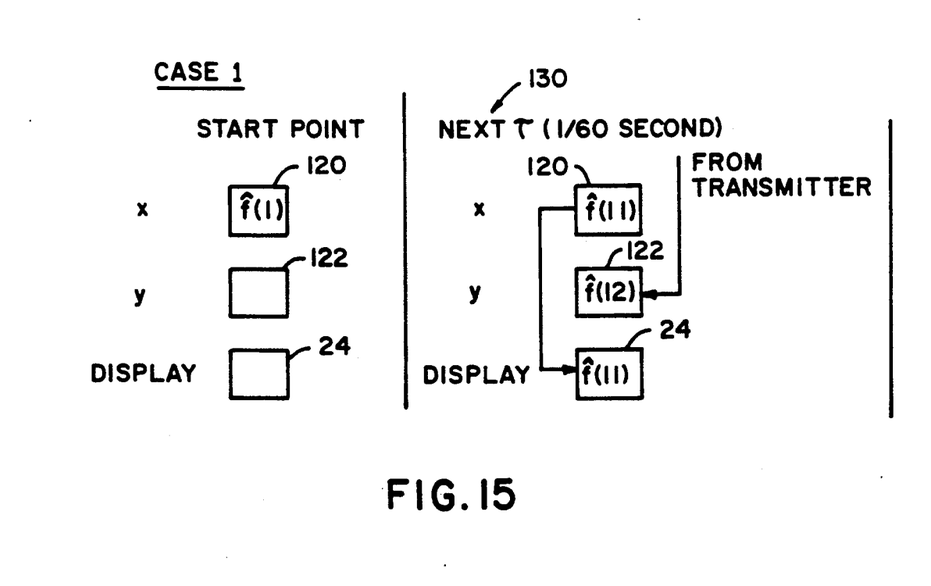
FIG. 15 is a diagram illustrating the two storage locations and the display of the embodiment at the starting point of FIG. 14 and shortly thereafter, when a low-resolution frame is transmitted.

Referring to FIG. 15, display case 1 refers to the situation where the next frame received is sent in low-resolution format and may thus correspond to encoding case IV or VI of FIGS. 4 and 5. In this case, in the next time interval 130 after the starting point, the received low-resolution frame f(12) is stored in the unused second buffer and the frame currently in the first buffer is displayed.

At the end of this time interval 130, image f(11) has been displayed, leaving the first buffer free to receive further information. This state is essentially the same as the basic state, and thus the process may continue with any of the three display cases.

Figure 16:
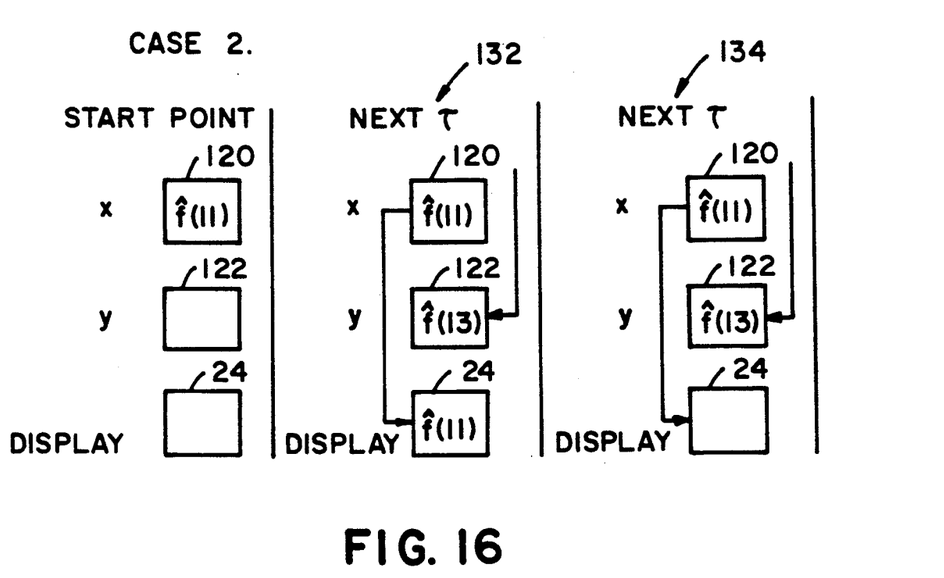
FIG. 16 is a diagram illustrating the two storage locations and the display of the embodiment at the starting point of FIG. 14 and shortly thereafter, when a present frame is represented by the frame previous to it and when the two halves of the high-resolution frame representing the next frame are successively received.
Figure 17:
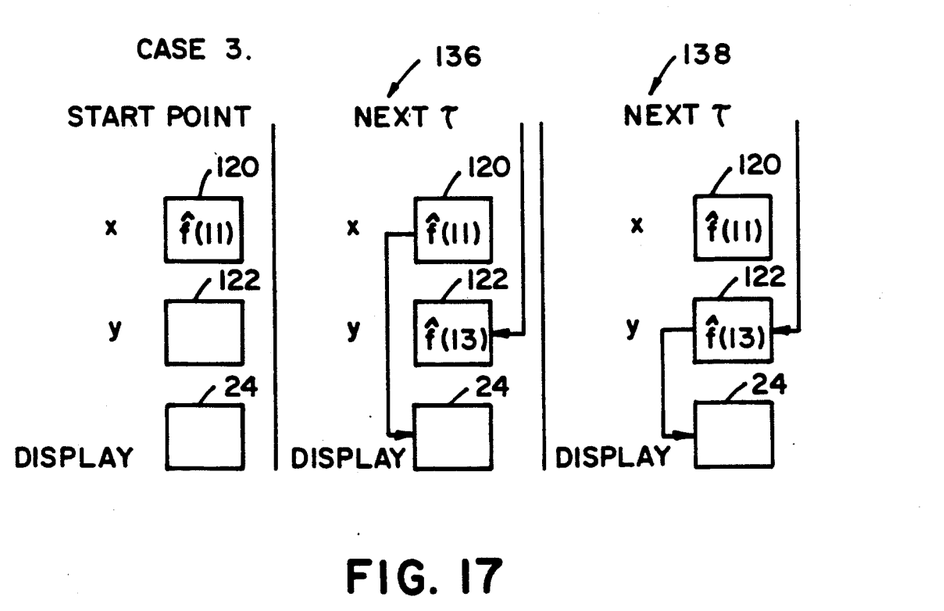
FIG. 17 is a diagram illustrating the two storage locations and the display of the embodiment at the starting point of FIG. 14 and shortly thereafter, when a present frame is represented by the frame following it and when the two halves of the high-resolution frame representing the following frame are successively received.

Referring to FIG. 16, display case 2 refers to the situation where the past frame is re-displayed and the next frame to be transmitted is a high-resolution frame. This display case may thus correspond to encoding case I or II of FIG. 4. In this case, in the next time interval 132 after the starting point, half of the received high-resolution frame $\hat{f}(13)$ is stored in the unused second buffer and the frame $\hat{f}(11)$ currently in the first buffer is displayed.

During the next time interval 134, the second half of the high-resolution frame $\hat{f}(13)$ is loaded into the second storage buffer 122. At the same time, the frame $\hat{f}(11)$ in the first buffer 120 is displayed again. At the end of this time interval 134, the first buffer is free to receive further information, and the receiving apparatus is thus in the basic state again.

Referring to FIG. 17, display case 3 refers to the situation where the next frame to be transmitted is a high-resolution frame and is to be displayed for the next two consecutive time intervals 136 and 138. This display case may thus correspond to encoding case I, III or V of FIGS. 4 and 5. In this case, in the next time interval 136 after the starting point, half of the received high-resolution frame $\hat{f}(13)$ is stored in the unused second buffer and the frame currently $\hat{f}(11)$ in the first buffer is displayed.

During the next time interval 138, the second half of the high-resolution frame $\hat{f}(13)$ is loaded into the second storage buffer 122, and at the same time, it is passed on to the display. At the end of this time interval 138, the first buffer is free to receive further information, and the receiving apparatus is thus in the basic state again.

The above methods assume that frame reconstruction may be done very quickly. In general, this should not be a problem with sufficiently sophisticated decoding hardware. If this is not the case, more frame buffers may be necessary.

In any case, additional temporary storage may be needed. This is because typically, to create even a small portion of the actual frame to be displayed, a certain portion of the information coming from the transmitter is required. This information may have to be stored in temporary storage buffers apart from the buffers 120, 122.

An assumption made in the above discussion is that the first transmitted half of the high-resolution frame $\hat{f}(13)$ in case 3 may be displayed without the rest of the frame present. This depends on the encoding method used. In the case of encoding methods where this assumption is not valid, one or more further frame buffers may be required.

Figure 18:
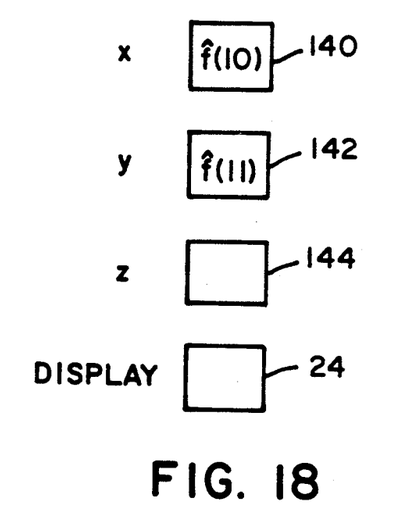
FIG. 18 is a diagram illustrating the status of the three storage locations and the display of a three-buffer embodiment at the starting point of a decoding cycle.
Figure 19:
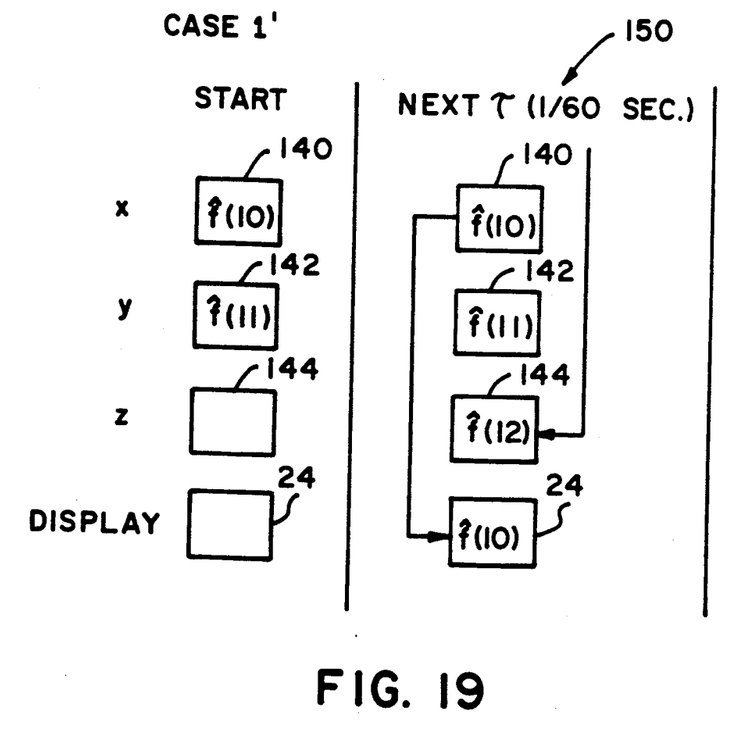
FIG. 19 is a diagram illustrating the three storage locations and the display of the three-buffer embodiment at the starting point of FIG. 18 and shortly thereafter, when a low-resolution frame is transmitted.
Figure 20:
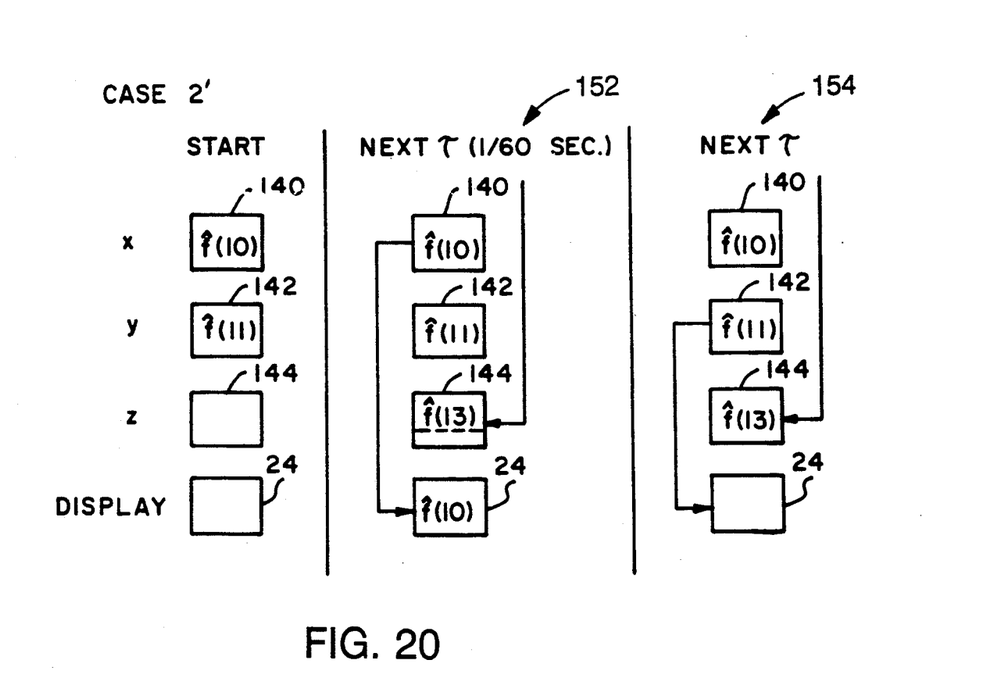
FIG. 20 is a diagram illustrating the three storage locations and the display of the three-buffer embodiment at the starting point of FIG. 18 and shortly thereafter, when a present frame is represented by the frame previous to it and when the two halves of the high-resolution frame representing the next frame are successively received.
Figure 21:
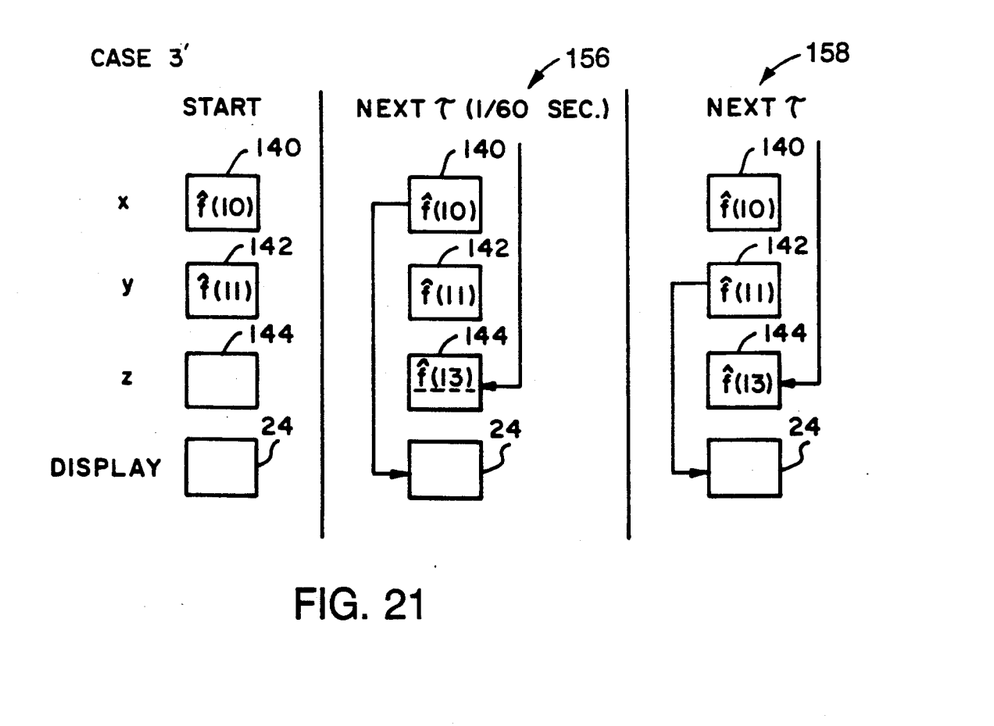
FIG. 21 is a diagram illustrating the three storage locations and the display of the three-buffer embodiment at the starting point of FIG. 18 and shortly thereafter, when a present frame is represented by the frame following it and when the two halves of the high-resolution frame representing the following frame are successively received.

A three-buffer implementation is presented in FIGS. 18-21. FIG. 18 shows the basic (or starting) state for this implementation, in which the first buffer 140 and the second buffer 142 contain frames and the third buffer 144 is unused. Again, there are three cases, this time dubbed display cases 1'-3'. These cases correspond to display cases 1-3 of FIGS. 14-17 and differ by the fact that each image is pipelined for one more time period before being displayed. This extra time period allows frame $\hat{f}(13)$ to be fully received before it is displayed in case 3', and thus the above assumption need not hold for this embodiment.

Although they do not need to be, the data compression techniques used to transmit the low-resolution and high-resolution frames (B1, B2) are preferably the same. In this way, only one frame encoder-decoder pair is needed, and problems such as the complexity that arises when using different encoding methods are avoided.

Figure 10:
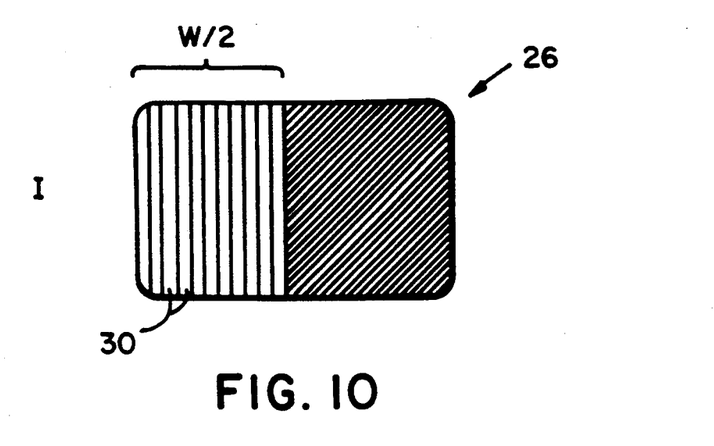
FIG. 10 is a diagram of a frame illustrating the transmission of a low-resolution frame.

In the present embodiment, when a low-resolution frame is to be compressed, it is compressed in the same way as the high-resolution image would be, except that it is compressed as a half width high-resolution frame, as shown in FIG. 10. This may be done by discarding every other column, or every other row (FIG. 11), or some combination of the two.

Figure 11:
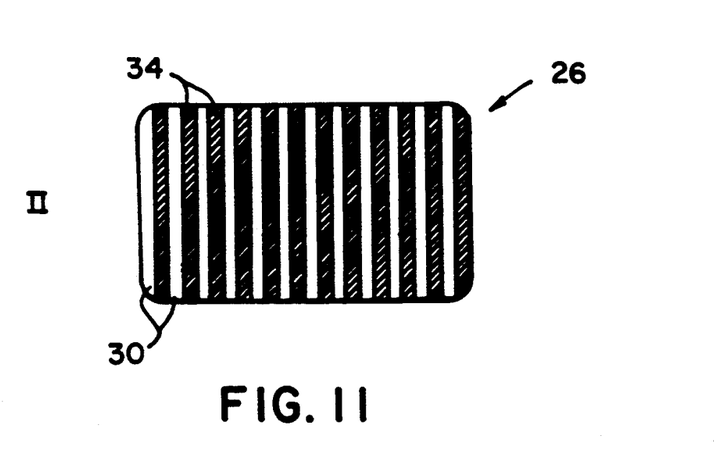
FIG. 11 is a diagram illustrating post-reception column interpolation of the frame of FIG. 10.

After the frame is decoded, an interpolation process is applied to generate the pixels to be displayed in the gaps 34 between the columns 30. The column-based interpolation process used may be the one described in my co-pending application entitled Improving Television Pictures, Ser. No. 07/421,152, filed Oct. 13, 1989, herein incorporated by reference.

The interpolation used could be row-based instead of column-based, but column-based interpolation is preferable in HDTV applications as the spatial resolution (number of picture elements) along the horizontal direction is typically higher in such an application. In the current HDTV system developed at the Massachusetts Institute of Technology, for example, a frame consists of 1280 (horizontal)×720 (vertical) pixels. Therefore losing some horizontal resolution due to column elimination and column interpolation would be preferable to losing some vertical resolution due to row elimination and row interpolation.

Figure 12:
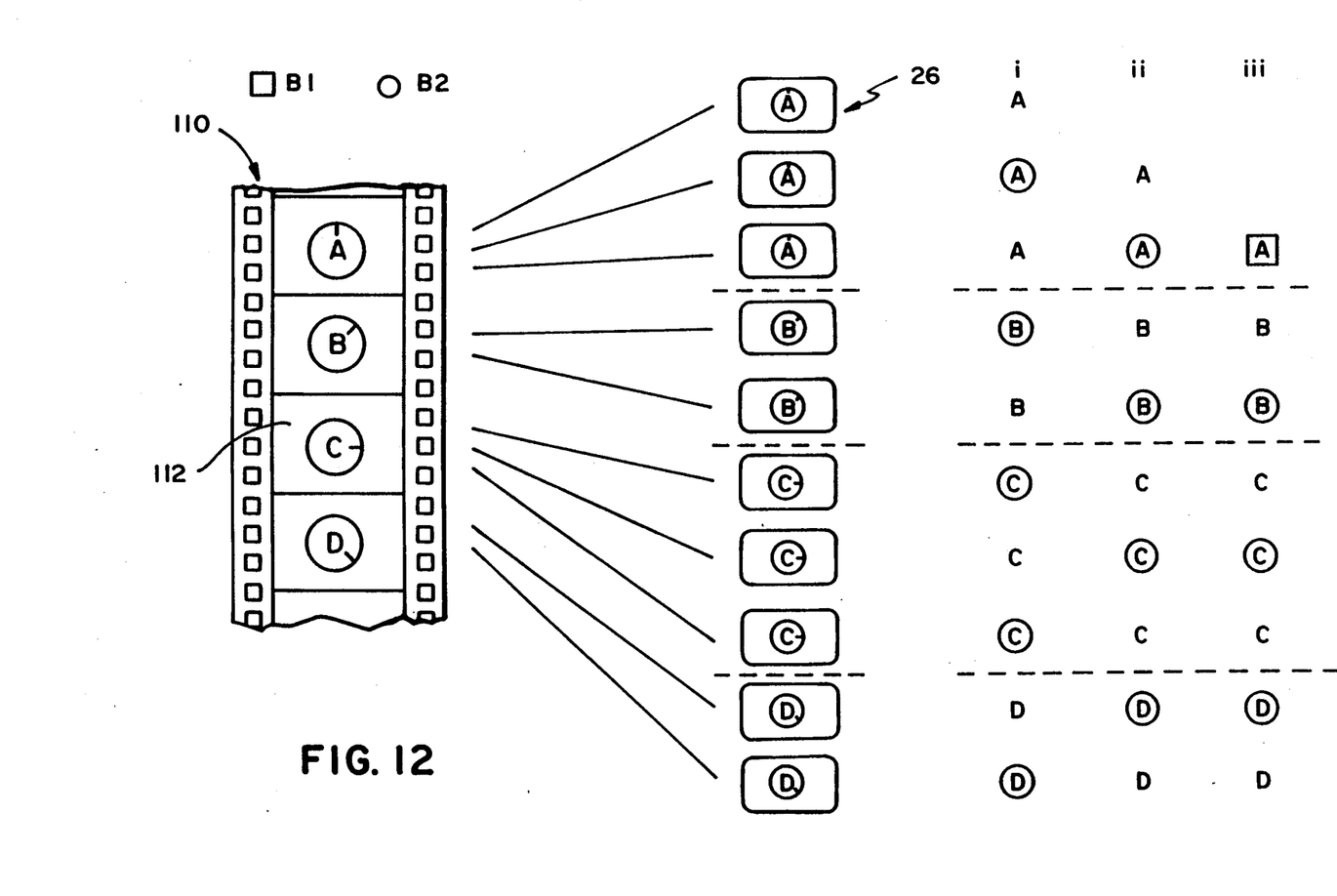
FIG. 12 is a diagram illustrating the operation of the method of the invention in the presence of a video signal that is in 3-2 pull-down format.

The single future frame look-ahead embodiment of the invention is particularly well suited for operation with video information that has been generated from film using the 3-2 pull-down format. As illustrated in FIG. 12, the 3-2 pull down format allows information recorded on film, which is normally transmitted at a frame rate of 24 frames per second, to be transferred to a video format, in which the frames are displayed at 60 frames per second. This is done by recording alternating frames onto two and then three video frames.

Still referring to FIG. 12, columns i, ii and iii show the operation of the method of the invention in the presence of video information in the 3-2 pull-down format, for different possible starting points in the sequence of first frames. In column i, A is a new frame, so that we are considering a situation of the type shown in case III of FIG. 4, and thus the second A-frame is encoded as a high-resolution frame and used to represent the first and second A-frames. Processing then skips to the third A-frame, yielding a case II situation, and therefore the first B-frame is encoded as a high-resolution frame which will represent both B-frames.

It may be seen that the cycle continues in a similar way and that all of the film frames are encoded to include at least one high-resolution frame. Cases ii and iii also encode the film frames in a similar manner. At the beginning of case iii, the A-frame is encoded as a low-resolution video frame (cases IV or VI), but the viewer will probably not notice the lack of resolution on a single video frame.

It is thus apparent that, with the exception of some of the very first and last frames, a sequence of 3-2 pull-down format video frames will always be encoded as high-resolution images. This will produce a significant enhancement to filmed material. This is advantageous because film is very common, and is also generally of very high spatial resolution. A two frame look-ahead system would allow every other film frame to be encoded with triple the base frame bandwidth thus improving video quality by a further amount.

In some cases successive frames of film will be sufficiently similar to cause the image compression to take place across film frames as well as within them as described above. In these cases, encoding with multiple levels of look-ahead will also provide some benefit.

This method is advantageous in that the encoder or decoder does not need to determine the presence of the 3-2 pull-down format, thereby avoiding the exceptionally poor picture quality that can sometimes result when such format-locked systems inadvertently lock onto a signal that is not in 3-2 pull-down format. The method has the further advantage over 3-2 format-lock systems in that a transmission error will only affect the frame in question, and will not cause the whole process to lose synchronization.

Methods for encoding 3-2 pull-down format signals are also discussed in my co-pending application entitled New Methods for Advanced Television System Design, Ser. No. 07/459,289, filed Dec. 29, 1989, herein incorporated by reference.

Figure 13:
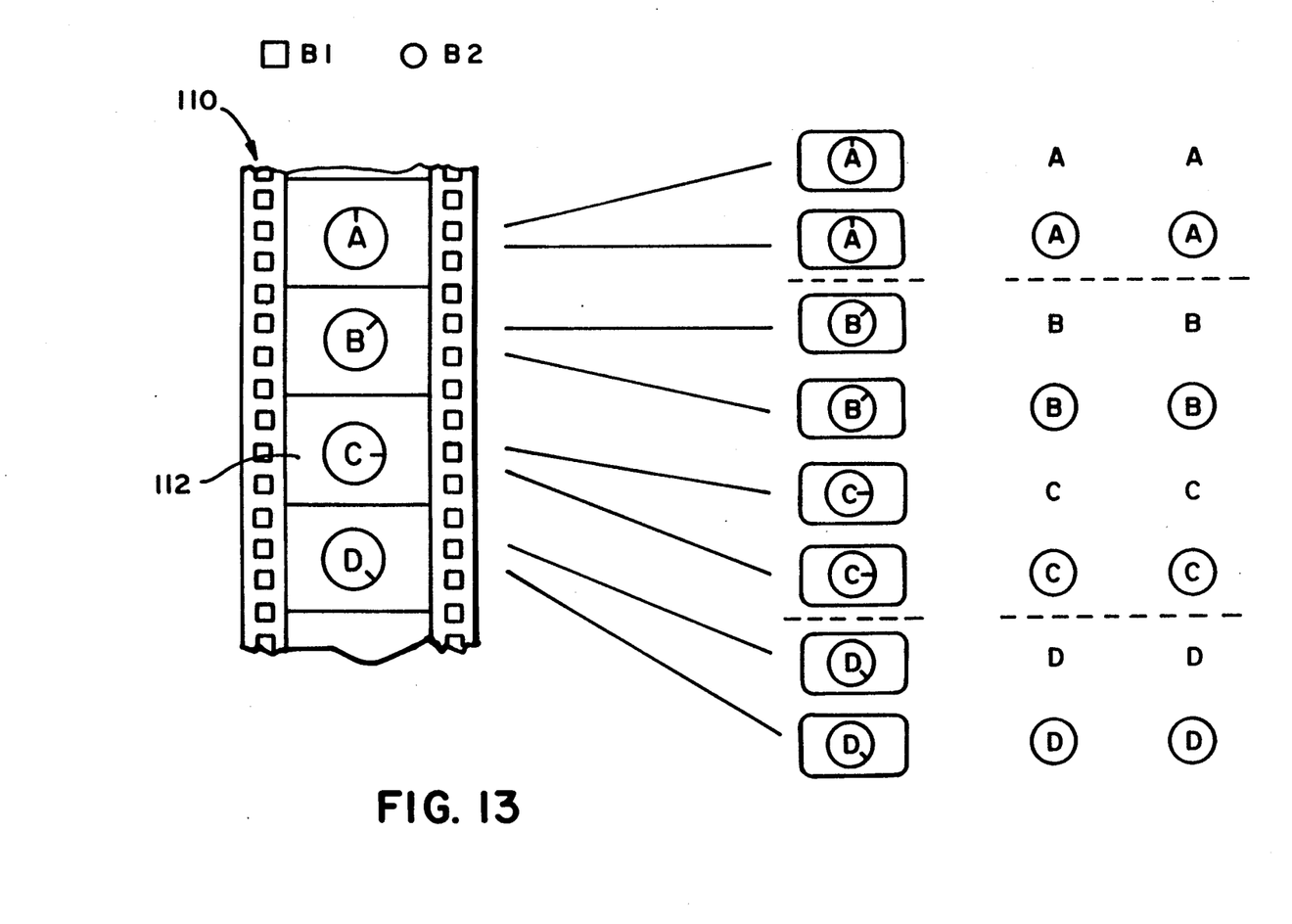
FIG. 13 is a diagram illustrating the operation of the method of the invention in the presence of a video signal that is in the European 2-2 pull-down format.

Referring to FIG. 13, the European 2-2 pull-down format is easily accommodated with the method of the invention. Indeed, each film frame 112 may be encoded as a high-resolution frame that is transmitted in a time slot two frames long. This represents a doubling of the amount of information sent for this type of format.

Other embodiments are within the scope of the following claims.

For example, it is not necessary to look at both the past and future frames. If only the past and present frames are considered, then, when the present frame is similar to the past frame, the past and present frames may be represented by the past frame and the future frame encoded at the high-resolution. If only the present and future frames are considered, then the past frame may be simply ignored, and the method considers only cases V and VI in FIG. 5. In this case, the past frame is not checked to determine whether it is a high-resolution frame. These methods may not perform as well as that of the earlier-described embodiment that considers three frames, but they are simpler computationally.

It also bears noting that the method described above has been designed for the purposes of real-time transmission, and that the method can be modified for improved performance in reducing the amount of storage space needed for a sequence of images. For example, if the present frame is similar to the past frame, and the past frame was coded with high resolution, then the encoder simply indicates that the present frame should be re-displayed. If the next frame is now the same as the two previous frames, the encoder may again indicate that the present frame should be re-displayed. This saves the storage space of this next frame. In the real time transmission method of the embodiment described above, this does not present any advantage, as the available bits in the time slots disappear when not used. These extra time slots could be used, however, by other data transmission services in a time-multiplexed manner.

Furthermore, instead of comparing the present frame with the past and future frames, it can be useful to compare them with reconstructed representations as they would actually be received and displayed. This is advantageous in that this representation is that which is actually used for the present frame. Also, when comparing the present frame with the reconstructed representation of the past frame, the encoder does not have to ignore past frames that are encoded in the low-resolution format, as they would in the case where the non-reconstructed versions are compared. This system would require the encoder to include further circuitry for decoding the encoded representations, and it is possible that these decoded results would not match those received by the receiver if there is significant channel noise.

A further improvement in picture quality can be achieved in those cases in which the difference between two frames is primarily a small displacement (e.g., as the result of a camera panning across a scene). In those cases, the successive frames can be represented by a single high-resolution frame (B2) and an estimate of the displacement. The displacement is transmitted as side information (e.g., its X and Y components, which can be transmitted using very little information). The receiver can then shift one of the frames by the prescribed displacement, to achieve a smoother representation of motion. The usual display overscan would allow small amounts of shifting, or special enhanced amounts of overscan could be used to provide for larger shifts, if desired.

What is claimed is:

1. A method for encoding a video signal, comprising the steps of
   continuously monitoring at least a present frame, a past frame, and a future frame in said video signal,
   determining from said frames whether said present frame is similar to said past frame and whether said present frame is similar to said future frame,
   based on said determinations deciding whether to encode the next transmitted frame as a low-resolution frame or a high-resolution frame and, when sending a high-resolution frame, determining whether to transmit an indication to re-display said past frame or to transmit an indication to display said high-resolution frame being sent as a representation of said present frame.

2. The method of claim 1 further comprising the step of determining whether said past frame was a high-resolution frame and using said determination of resolution as a factor in said decision.

3. The method of claim 2 wherein said determination of resolution occurs before said determination of similarity between said present frame and said past frame, and renders said determination of similarity between said present frame and said past frame unnecessary for at least some of the frames, whereby computational resources may be conserved.

4. The method of claim 1 wherein said low-resolution frames are placed in a format that allows them to be encoded using the same method for encoding frames as that used for the high-resolution frames.

5. The method of claim 4 wherein said low-resolution frames are transmitted as partial frames and the frames are filled before being displayed, using an interpolation technique.

6. The method of claim 5 wherein said interpolation is a line-interpolation technique.

7. The method of claim 5 wherein said interpolation is a column-interpolation technique.

8. The method of claim 1 wherein said video signal contains information in 3-2 pull-down format.

9. The method of claim 1 wherein at least one of said steps of determining similarity is performed with a frame that has been reconstructed from the encoded frame by decoding said encoded frame.

10. The method of claim 1
further including
the step of encoding, and then reconstructing by decoding, said future frame before said determination of whether said present frame is similar to said future frame, and
the step of reconstructing said past frame by decoding an encoded version of said past frame before said determination of whether said present frame is similar to said past frame, and
wherein said steps of determining similarity are based on said reconstructed present and past frames.

11. The method of claim 1 wherein said determinations are made based on evaluating a gauging function against a threshold.

12. The method of claim 11 wherein said gauging function is a mean-square error function.

13. The method of claim 11 wherein said gauging function includes a motion compensated mean-square error function and a displacement magnitude.

14. The method of claim 1 wherein said determinations of similarity are used to determine whether said present frame should be represented as said past frame or said future frame when said present frame is similar to both said past and said future frames.

15. The method of claim 14 wherein said determinations of whether said present frame is similar to said past frame and whether said present frame is similar to said future frame are weighted unequally relative to each other to achieve a preference for representing said present frame as said past frame or said future frame.

16. The method of claim 15 wherein said preference favors said future frame.

17. The method of claim 1 wherein the step of monitoring frames includes more than three frames and wherein further determinations are made based on said further frames.

18. A method for encoding a video signal, comprising the steps of
continuously monitoring at least a present frame, a past frame, and a future frame in said video signal,
determining whether said present frame is similar to said future frame,
determining whether said past frame and said present frame are similar, I) if said present and future frames are determined to be similar, and said past and present frames are determined to be similar, then representing the present frame by one of the past or future frames based on a certain measure and encoding the future frame in high-resolution format, II) if said present and future frames are determined to be different and said past and present frames are determined to be similar, then representing the present frame by the past frame and encoding the future frame in high-resolution format, III) if said present and future frames are determined to be similar and said past and present frames are determined to be different, then representing the present frame by the future frame and encoding the future frame in high-resolution format, IV) if said present and future frames are determined to be different, and said past and present frames are determined to be different, then encoding the present frame in low-resolution format.

19. A method for encoding a video signal, comprising the steps of
continuously monitoring at least a present frame, a past frame, and a future frame in said video signal,
determining whether said present frame is similar to said future frame,
determining whether said past frame was encoded in high-resolution format or in low-resolution format,
if said past frame was encoded in high-resolution format, determining whether said past frame and said present frame are similar, I) if said present and future frames are determined to be similar, and said past and present frames are determined to be similar, and said past frame was encoded in high-resolution format, then representing the present frame by one of the past or future frames based on a certain measure and encoding the future frame in high-resolution format, II) if said present and future frames are determined to be different and said past and present frames are determined to be similar and said past frame was encoded in high-resolution format, then representing the present frame by the past frame and encoding the future frame in high-resolution format, III) if said present and future frames are determined to be similar and said past and present frames are determined to be different and said past frame was encoded in high-resolution format, then representing the present frame by the future frame and encoding the future frame in high-resolution format, IV) if said present and future frames are determined to be different, and said past and present frames are determined to be different, and said past frame was encoded in low-resolution format, then encoding the present frame in low-resolution format, V) if said present and future frames are determined to be similar and said past frame was encoded in low-resolution format, then representing the present frame by the future frame and encoding the future frame in high-resolution format, and VI) if said present and future frames are determined to be different, and said past frame was encoded in low-resolution format, then encoding the present frame in low-resolution format.

20. A method for decoding an encoded video signal comprising the steps of
receiving said video signal as a series of frames encoded as high-resolution frames and low-resolution frames, and indications indicating which of said high-resolution frames are to be repeated and whether said high-resolution frames are to be repeated to replace a later frame or an earlier frame producing a decoded series of video frames from said series of received frames and said indications, wherein at least some of said high-resolution frames are repeated at least once in said decoded series of video frames.

21. A method for decoding a video signal including a series of encoded frames wherein at least some of said frames are high resolution frames, said signal also including indications indicating which of said high-resolution frames are to be repeated and whether said high-resolution frames are to be repeated to replace a later frame or an earlier frame comprising receiving said encoded frames, buffering information from each of said received frames in a plurality of buffers, and producing a decoded series of video frames from said series of received frames and said indications, by alternatively accessing the buffered frames and repeating said at least some of said high-resolution frames in said decoded series based on said indications by re-accessing one of said buffers.

22. The method of claim 21 wherein said plurality of buffers is a pair of buffers.

23. Apparatus for encoding a video signal, comprising circuitry for continuously monitoring at least a present frame, a past frame, and a future frame in said video signal, including computational circuitry for determining from said frames whether said present frame is similar to said past frame and whether said present frame is similar to said future frame, encoding circuitry, associated with said computational circuitry, for encoding the next transmitted frame as a low-resolution frame or a high-resolution frame and, when sending a high-resolution frame, determining whether to transmit an indication to re-display said past frame or to transmit an indication to display said high-resolution frame being sent as a representation of said present frame based on determinations obtained from said computational circuitry.

24. A decoder for decoding a video signal including a series of encoded frames wherein at least some of said frames are encoded as high-resolution frames and some of said frames are encoded as low-resolution frames, said signal also including indications indicating which of said high-resolution frames are to be repeated and whether said high-resolution frames are to be repeated to replace a later frame or an earlier frame, said decoder comprising a receiver for receiving said encoded frames, first and second storage buffers responsive to said receiver which accept frames received by said receiver, and circuitry controlling access to said buffers for producing a decoded series of video frames from the contents of alternating ones of said storage buffers and from said indications wherein at least some of said high-resolution frames are repeated at least once in said decoded series of video frames by re-accessing one of said buffers based on said indications.

25. The apparatus of claim 24 further including a third storage buffer responsive to said receiver which accepts frames received by said receiver.

26. The method of claim 1 further comprising, in the case when a high-resolution frame is to represent two successive frames (e.g., past and present frames), the step of estimating the displacement between the two successive frames.

27. The method of claim 1 wherein, when a high-resolution frame has been encoded at the transmitter, using the high-resolution frame for two successive frames at the receiver.

28. The method of claim 27 further comprising the steps of estimating (during encoding) the displacement between the two successive frames, transmitting the estimated displacement, and shifting (during decoding) the high-resolution frame by the amount of the displacement when displaying one of the two successive frames.

29. The method of claim 28, 21, or 24 wherein repetition of the high-resolution frame includes shifting the frame by an estimated displacement (estimated by the encoder and transmitted to the decoder).

30. A method for receiving decoded video frames from a decoder and transmitting said decoded frames, comprising the following steps:

receiving said video signal as a series of frames, some of which were encoded as high-resolution frames and others of which were encoded as low-resolution frames;

selectively receiving indications whether a frame is to be re-displayed;

providing a first buffer and a second buffer wherein said first buffer contains a first decoded frame; and I) if the next decoded frame received is low-resolution frame, then storing said next decoded frame in said second buffer and transmitting said first decoded frame;

II) if the next decoded frame received is high-resolution and an indication is received to re-display said first decoded frame, then receiving a portion of said next decoded frame and transmitting said first decoded frame, and then receiving the remainder of said next decoded frame and re-transmitting said first decoded frame;

III) if the next decoded frame received is high-resolution and there is no indication to re-display said first decoded frame, then receiving a portion of said next decoded frame in said second buffer and transmitting said first decoded frame, and then receiving the remainder of said next decoded frame and transmitting said next decoded frame.

31. A method for receiving decoded video frames from a decoder and transmitting said decoded frames comprising the following steps:

receiving said video signal as a series of frames, some of which were encoded as high-resolution frames and others from which were encoded as low-resolution frames;

providing a first buffer, a second buffer, and a third buffer, wherein said first buffer contains a first decoded frame and said second buffer contains a second decoded frame;

I) if the next decoded frame is a low-resolution frame, then receiving said next decoded frame in said third buffer and transmitting said first decoded frame;

II) if the next decoded frame is a high-resolution frame, then receiving a portion of said next decoded frame in said third buffer and transmitting said first decoded frame, and then receiving the remainder of said next decoded frame and transmitting said second decoded frame.

* * * * *